Figure 1:
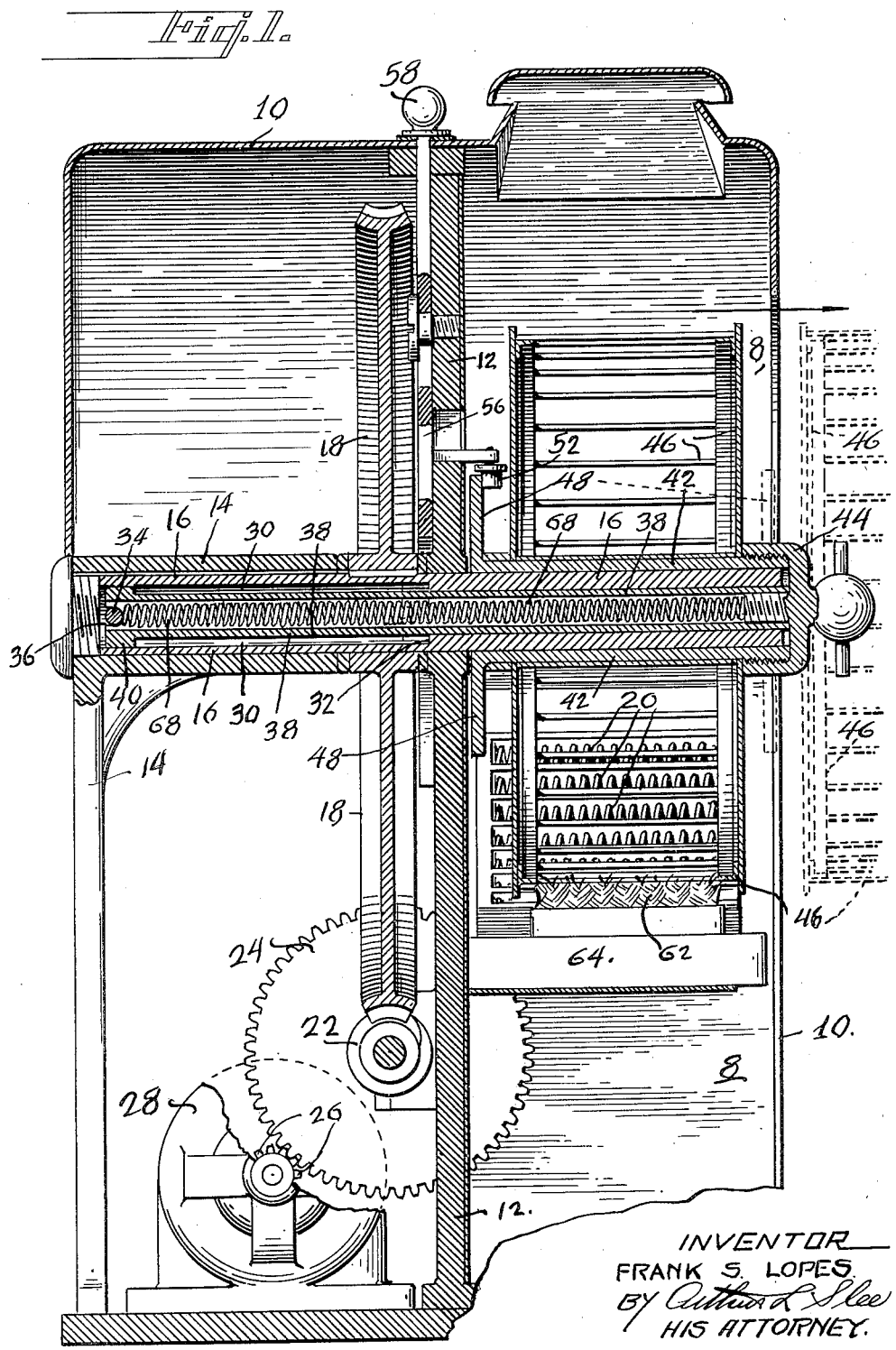

May 9, 1950 F. S. LOPES 2,506,931
SAUSAGE TOASTER
Filed Aug. 3, 1948 2 Sheets-Sheet 1

INVENTOR
FRANK S. LOPES
BY Arthur L. Slee
HIS ATTORNEY.

May 9, 1950 — F. S. LOPES — 2,506,931
SAUSAGE TOASTER

Filed Aug. 3, 1948 — 2 Sheets-Sheet 2

INVENTOR
FRANK S. LOPES
BY Cutter & Slee
HIS ATTORNEY.

Patented May 9, 1950

2,506,931

UNITED STATES PATENT OFFICE 2,506,931

SAUSAGE TOASTER

Frank S. Lopes, Redwood City, Calif.

Application August 3, 1948, Serial No. 42,175

7 Claims. (Cl. 99—335)

The present invention relates to improvements in a sausage toaster wherein a squirrel wheel operates in conjunction with a releaseable latch arranged to hold said wheel in operative connection with spring projection means and rotating means to rotate said squirrel wheel and contents thereof directly above heating elements within a housing having an open front, said latch being actuated by rotation of said wheel, after a predetermined period, to release said wheel and permit said spring means to project or extend said wheel and its contents from above said heating elements and beyond or directly in front of said open front of said housing, together with grease removing means arranged to remove grease from said wheel, to prevent fouling of said heating elements directly thereunder, and to reduce fire risk.

The primary object of the present invention is to provide a new and improved sausage toaster having improved means arranged to uniformly toast or roast one or more sausages.

Another object is to provide a new and improved device of the character set forth having improved means for projecting or extending a rotating squirrel wheel away from above heating elements after a predetermined period.

A further object is to provide a new and improved sausage toaster having improved means for constantly removing excess grease or drippings from sausages or similar products being toasted therein.

A still further object is to provide a new and improved toaster for sausages and the like having a greatly simplified and economically produced construction and a maximum efficiency.

I accomplish these and other objects by means of the improved toaster disclosed in the drawings forming a part of the present application, and in which—

Figure 2:
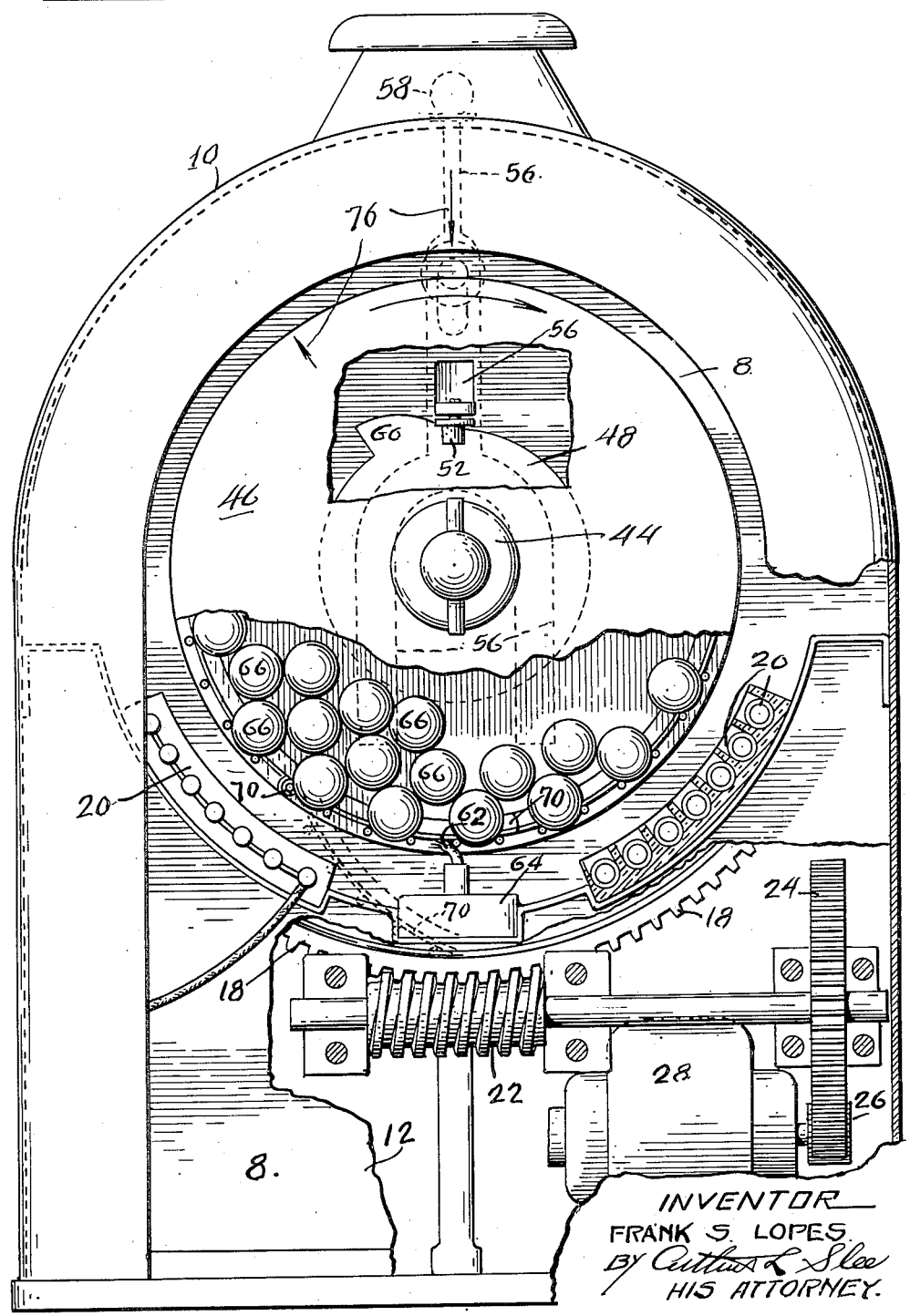

Fig. 1 is a partly broken central vertical sectional view of my improved toaster, with the several parts shown in operative position in full lines, and an inoperative position partly illustrated by dotted lines; and Fig. 2 is a front elevation, partly broken to produce a substantially composite view of the several parts in their related operative positions.

Referring to the drawings:

The numeral 1 is used to designate in general a suitable housing having an open front portion 8 and a vertically disposed central partition 12, within which, and also in a rear bracket provided for the purpose, is rotatably mounted a horizontally disposed hollow shaft 16 having its front end extending into said open portion 8 of the housing 10 and directly above a pair of preferably arcuate heating elements 20 therein. The shaft 16 has mounted thereon a worm gear 18 operated by a worm 22 connected through suitable reduction gears 24 and 26 to a suitable motor 28.

The rear end of the hollow shaft 16 is counterbored, as at 30, through approximately one-half its length, to provide an internal shoulder 32. Said shaft 16 is also provided at the rear end thereof with a cross bar or key 34 arranged detachably to engage diametrically opposed slots or recesses 36 within the rear end of a tube 38 rotatably and slidably mounted within the hollow shaft 16, and whose rear end is provided with a collar 40 arranged to engage the internal shoulder 32 within the shaft 16 and thereby limit longitudinal movement of said tube 38 within the hollow shaft 16, the purpose of which hereinafter more fully will be set forth.

A sleeve 42 is arranged to enclose the outer end of the hollow shaft 16, in the open front portion 8 of the housing 10, and in turn has its outer or front end connected to the outer end of the tube 38 by means of a suitable cap 44. The sleeve 42 has mounted thereon what I term for descriptive purposes a squirrel wheel 46, preferably with closed sides. The sleeve 42 also has rigidly mounted thereon and on its inner end a flange or disk cam 48 arranged to be engaged by a flanged roller 52 mounted upon a vertically disposed latch 56 slidably mounted upon the central partition 12 and ending in a suitable knob 58 above and exteriorly of the housing 10, whereby said latch 56 manually may be actuated independently of an extension 60, seen only in Fig. 2 of the drawings, said extension 60 being arranged to actuate the said latch 56 by rotation, after a predetermined period, of the sleeve 42, squirrel wheel 46 and cam 48.

Directly under the lower portion of the periphery of the squirrel wheel 46 is a suitable wick 62 extending upwardly from a suitable container 64 arranged between the lower ends of the arcuate heating elements 20, as fully disclosed in Fig. 2 of the drawings. The function of the wick 62 is to wipe and remove excessive fat or grease drippings from the lower portion of the periphery of the squirrel wheel 46 and any sausage 66 which may project below said wheel, whereby accumulated grease drippings from sausages being toasted will be prevented from dropping upon and thereby fouling the heating elements 20 below said squirrel wheel 46 as the same is being rotated during a toasting or roasting process.

A suitable spring 68 is interposed within the tube 38 and between the front closed end thereof and the key or bar 34 in the end of the hollow shaft 16, said spring 68 being compressed and arranged normally to project said tube 38, cap 44, sleeve 42 and squirrel wheel 46 and cam 48 outwardly and beyond the open front 8 of the housing 10, as indicated in dotted lines in Fig. 1 of the drawings.

The squirrel wheel 46 may be provided preferably upon the periphery thereof with a normally spring held and closed door 70, indicated in open position in dotted lines in Fig. 2 of the drawings.

In operation:

Sausages 66, or similar items to be toasted or roasted, are placed within the squirrel wheel 46 while the same is in projected position. Assuming the motor 28 to be operating; the hollow shaft 16, through the reduction gearing 26 and 24, worm 22 and gear 18 and key 34 in the rear end of said shaft 16 will be rotating. The latch 56 is raised manually by means of its external knob 58, and the squirrel wheel 46, with its connected sleeve 42 and cam 48 are moved inwardly, to compress the spring 68, to operative position shown in Fig. 1 of the drawings, and the latch 56 is then dropped to permit the flanged roller 52 thereof to engage the cam 48, at which time the slot 36 of the tube 38 will engage the key 34 of the hollow shaft 16 whereby said squirrel wheel 46 and contents 66 thereof will be rotated by shaft 16 and key 34 thereof at a comparatively low rate of speed, which rotation, after a predetermined period, will actuate the latch 56 and roller 52 through the extension 60 of said cam 48 and thereby release the cam 48, sleeve 42 and squirrel wheel 46 thereon, at which time the compression of the spring 68, through the tube 38 and cap 44, will project the squirrel wheel 46 and contents 66 thereof outwardly and away from the heating elements 20 and disengage the slot 36 of the tube 38 from the key 34 of the shaft 16, at which time the said wheel 46 will become stationary and out in front of the open front 8 of the housing 10, and therefore readily accessible for removing or replenishing contents.

The predetermined period may comprise a complete revolution of the squirrel wheel 46, or such portion thereof as may be desirable and as may be indicated by the relative positions of the arrows 76 upon the fronts of the housing 10 and wheel 46.

It should be particularly noted that during the comparatively slow rotation of the squirrel wheel 46, through a predetermined period, such rotation will cause the substantially cylindrical sausages 66 to rotate and tumble around and over each other and thereby simultaneously present all sides of said sausages equally to the action of heat from the heating elements 20 and thereby uniformly toast all of said sausages. It also should be noted that, during rotation of said squirrel wheel 46, the wick 62 automatically will remove excess grease from said wheel and thereby prevent fouling of the said heating elements by dripping grease, and also materially reduce fire risk.

Having described my invention, I claim:

1. A sausage toaster comprising a housing; a horizontally disposed shaft rotatably mounted within said housing; rotating means arranged to rotate said shaft; a squirrel wheel slidably mounted on and detachably connected to rotate with said shaft; heating elements mounted under said squirrel wheel; means arranged normally to disconnect from rotation with said shaft and slide said squirrel wheel upon said shaft; a latch arranged to prevent slidable movement of said wheel on said shaft; and releasing means arranged to release said latch.

2. A sausage toaster comprising a housing; a horizontally disposed shaft rotatably mounted within said housing; rotating means arranged to rotate said shaft; a squirrel wheel slidably mounted upon and detachably connected to rotate with said shaft; heating elements mounted within said housing and below said wheel when the same is in one position on said shaft; means arranged normally to disconnect from rotation with and slide said squirrel wheel on said shaft and away from said heating elements; a retaining latch arranged to retain said wheel above said elements; and releasing means arranged to be actuated by rotation of said wheel, after a predetermined period, to release said squirrel wheel.

3. A sausage toaster comprising a housing open at the front; a horizontal shaft rotatably mounted within said housing and having one end extended into said open front; a squirrel wheel slidably mounted upon said end and in said open front and detachably connected to rotate with said shaft; heating elements mounted within said housing and below said wheel; spring means arranged normally to disconnect from rotation with and to slide said wheel upon said shaft and beyond said heating elements; a retaining latch mounted within said housing and arranged to retain said wheel over said heating elements; and a cam mounted upon said squirrel wheel and arranged to be actuated by rotation of said wheel, to trip said latch and release said cam and squirrel wheel.

4. A sausage toaster comprising a housing; a horizontally disposed shaft rotatably mounted within said housing; rotating means arranged to rotate said shaft; a squirrel wheel slidably mounted upon and detachably connected to rotate with said shaft; heating elements mounted within said housing and below said wheel when the same is in one position on said shaft; means arranged normally to disconnect from rotation with and to slide said squirrel wheel on said shaft and away from said heating elements; a retaining latch arranged to retain said wheel above said elements; releasing means arranged to be actuated by rotation of said wheel, after a predetermined period, to release said squirrel wheel from said latch; and a grease remover arranged to contact the periphery of said wheel and remove grease therefrom.

5. A sausage toaster comprising a housing having an open front; a horizontal hollow shaft rotatably mounted within said housing and having its front end extended into said open front; rotating means arranged to rotate said hollow shaft at a comparatively low rate of speed; a tube slidably mounted within and detachably connected to rotate with said hollow shaft for limited longitudinal movement only; spring means mounted within said hollow shaft and tube and arranged normally to disconnect from rotation with said shaft and to slide said tube through said limited movement in said hollow shaft; a squirrel wheel operatively connected to said tube; heating elements mounted within said housing and under said squirrel wheel; a cam connected to said wheel; and a latch slidably mounted within said housing and arranged to engage said cam and hold the same and said wheel within said housing and above said heating elements, and arranged to be actuated by rotation of said squirrel wheel to release said latch to permit said spring means to move said tube longitudinally within said hollow shaft and said squirrel wheel from above said heating elements.

6. A sausage toaster comprising a housing having an open front; a hollow shaft rotatably mounted within said housing and having a front end extended into said open front of said housing; a tube rotatably and slidably mounted within said hollow shaft for limited longitudinal movement only; a key on said shaft arranged to rotate said tube with said shaft when said tube is in one inner extreme position therein; spring means mounted within said shaft and tube and adapted normally to project said tube longitudinally within said shaft and beyond the open front of said housing; a sleeve connected to said tube and arranged to enclose the front end of said hollow shaft; a squirrel wheel, having closed sides, mounted upon said sleeve; heating elements mounted within said open front and under said squirrel wheel and front end of said hollow shaft; a cam connected to said squirrel wheel and sleeve; and a latch slidably mounted within said housing and arranged to engage said cam and hold said sleeve and squirrel wheel thereon over said heating elements, and actuated by rotation of said wheel and cam to release the same to permit said spring means to project said squirrel wheel beyond said heating elements and through the open front of said housing.

7. A sausage toaster comprising a housing; a horizontally disposed shaft rotatably mounted within said housing; rotating means arranged to rotate said shaft; a squirrel wheel slidably connected to said shaft and detachably connected to rotate therewith; heating elements mounted within said housing and below said squirrel wheel when the same is in one position; spring means arranged normally to slide said squirrel cage on said shaft and away from said heating elements; a retaining latch mounted within said housing and arranged to retain said squirrel wheel above said elements; releasing means arranged to be actuated by rotation of said wheel, after a predetermined period, to release said squirrel wheel and permit the same to be moved away from said heating elements; a container arranged below said squirrel wheel; and a wick projecting upwardly from said container and arranged to collect grease from the periphery of said wheel during rotation thereof.

FRANK S. LOPES.

REFERENCES CITED

The following references are of record in the file of this patent:

UNITED STATES PATENTS

| Number | Name | Date |
| --- | --- | --- |
| 1,733,766 | Wilkowski | Oct. 29, 1929 |
| 1,778,997 | Drysdale | Oct. 21, 1930 |
| 1,986,412 | Rudolph | Jan. 1, 1935 |
| 1,993,607 | Kaldren | Mar. 5, 1935 |